CATALYTIC CONTROL OF AUTO EXHAUST EMISSIONS
Filed Aug. 12, 1971

ENGINE → $HC, CO, NO_x$

EXHAUST GASES ↓

FIRST CATALYST BED — Pt ON ACIDIC SUPPORT

↓ $HC, CO, N_2, H_2$ ← OXIDIZING ATMOSPHERE (AIR)

SECOND CATALYST BED — PALLADIUM

↓ $HC, N_2, H_2, CO_2$

THIRD CATALYST BED — HYDROCARBON OXIDATION CATALYST

↓ $CO_2, H_2, N_2$

James R. Graham
INVENTOR.

United States Patent Office 3,741,725
Patented June 26, 1973

3,741,725
CATALYTIC CONTROL OF AUTO
EXHAUST EMISSIONS
James R. Graham, 5259 Hayledge Court,
Columbia, Md. 21043
Filed Aug. 12, 1971, Ser. No. 171,151
Int. Cl. B01d 53/00
U.S. Cl. 423—213                4 Claims

ABSTRACT OF THE DISCLOSURE

A platinum catalyst system is described which is effective in removing $NO_x$ from auto exhaust emissions in a three-bed system in which the $NO_x$ is reduced in the first bed, the hydrocarbons and carbon monoxide are partially oxidized in the second bed and the hydrocarbon and carbon monoxide oxidation is completed in the third bed.

BACKGROUND OF THE INVENTION

(1) Prior art

The problem of air pollution is not a new one. However, in recent years the problem has become more and more acute as the number of vehicles has increased. Much of the pollution is a result of organic pollutants which are derived from unburned or partially burned hydrocarbons in the exhaust of internal combustion engines.

The exhaust gases of the internal combustion engine also contains oxides of nitrogen (designated $NO_x$). In the presence of sunlight, photolysis of the oxides of nitrogen leads to the formation of measurable quantities of ozone. The ozone, in turn, reacts with various organic pollutants to form compounds which can cause the many undesirable manifestations of smog, such as eye irritation, visibility reduction, and plant damage.

If there is not a rapid dispersion of pollutants due to meteorological conditions, a smog condition results. In addition to the hydrocarbons and nitrogen oxides, another pollutant which is of much concern is carbon monoxide which is undesirable because of its toxic nature. It, too, is derived mainly from exhaust emissions.

Almost since the advent of the automobile attempts have been made to solve the problem by rendering harmless and unobjectionable the noxious fumes which are the by-products of internal combustion engines. Various devices and filters using elementary catalytic materials, and from the 1920's on, various modifications of filters and mufflers, have been designed in an attempt to solve this problem. Unfortunately, to date none have met with success complete enough for practical application. One of the most difficult problems to overcome is the fact that although a given purification system appears to work initially, within a short period of time it becomes catalytically inactive and consequently useless.

It does not seem feasible to install catalytic systems which must be periodically removed and rejuvenated because of the cost of such a system and such rejuvenation. Another of the problems which several investigators have realized is that the only practical way to treat exhaust fumes to reduce hydrocarbon, carbon monoxide, and nitrogen oxide pollution, is to oxidize the hydrocarbons to carbon dioxide and water and the carbon monoxide to carbon dioxide, and reduce the nitrogen oxides to nitrogen and oxygen. There is therefore the problem of finding a catalytic system which is capable of both oxidizing and reducing.

A wide selection of oxidation catalysts have been produced in the past. With respect to chemical composition, the ability of a wide variety of metals and metal oxides, either alone or in combination, to catalyze the complete oxidation of hydrocarbons has been noted. The same is true of carbon monoxide emissions.

To be sufficiently effective for the removal of hydrocarbons, carbon monoxide, and nitrogen oxides from auto exhaust gases and to meet the standards of maximum emissions currently under consideration in the legislatures of the various states, a catalyst for treating exhaust gases must become efficient within a very few seconds after engine start-up and must maintain its activity throughout the various modes of engine operation. The problem of excessively high temperatures which are obtained when concentrations of pollutants are being oxidized, or reduced, must also be solved in this system. It is not unusual for catalytic temperatures to reach 1600° F. or higher. A normal catalytic system cannot withstand prolonged exposure to these temperatures without thermal or thermochemical degradation of a catalyst. For example gamma or eta alumina, which are common and useful supports or carriers, are seriously affected by high temperatures.

The problem of conversion of carbon monoxide, nitrogen oxides, and hydrocarbons at the low temperatures obtained in a catalytic muffler system at the start-up period of engine operation is also particularly troublesome. A catalyst must be active enough initially to be acceptable for use in an auto exhaust catalyst system. It is not sufficient that a catalyst will have a good activity after the engine has warmed up and after the catalyst bed is at a temperature sufficiently high to cause exhaust vapors passing through the bed to be oxidized to carbon dioxide and water and reduced to nitrogen.

Catalytic systems which have been devised give satisfactory results for carbon monoxide and hydrocarbon conversion but frequently suffer from relatively poor conversion of hydrocarbons and nitrogen oxides, and vice versa. This is particularly true at low temperatures. Since the ideal catalytic system gives a good conversion of each of the exhaust gas components at low temperatures as well as high, this problem is of prime importance.

Both platinum and palladium have been reported in the literature to be effective catalysts for the removal of carbon monoxide and hydrocarbons from auto exhaust. However, neither is a sufficiently active oxidation catalyst to meet the 1975 Federal Auto Emission Standards, unless present in large concentrations. Platinum has further been reported to be unsatisfactory for the removal of $NO_x$ from auto exhaust even under the most favorable conditions.

Other catalytic components such as compositions of copper, chromium, and manganese oxides and palladium, copper, chromium, and manganese oxides, and the like are well-known in the art to be useful hydrocarbon oxidation catalysts. However, these catalysts are also not sufficiently active to meet the 1975 Federal Auto Emission Standards. Another useful hydrocarbon oxidation catalyst is cobalt oxide promoted with palladium and further optionally containing oxides of nickel, chromium, manganese, and iron. Of course, other hydrocarbon oxidation catalysts are also well-known.

The problem of finding a catalyst—catalyst support or catalytic system which is capable of both oxidizing the carbon monoxide and hydrocarbons and also reducing the nitrogen oxides which are found in automotive exhaust gases and is capable of thermal and chemical stability is therefore very significant to the automotive industry.

As regards the catalyst support, one of the problems is that when a favored support, alumina, is used in the gamma form there is a sufficient surface activity and surface area. However, as the temperature increases the gamma (or other transition forms of alumina) undergoes a change to alpha-alumina. This is undesirable because of a loss of surface activity due to the crystallization of the transitional aluminas at high temperatures. This in turn lessens the activity of the catalyst which is contained on the support and affects the catalyst's effectiveness. Further, a support alumina shrinks in volume as the conversion to alpha-alumina takes place at the high temperatures. As described in copending application U.S. Ser. No. 152,388, filed June 11, 1971, and assigned to the same assignee, this problem can be solved by the use of rare earth oxides. That technique is also useful and desirable when alumina is used as the catalyst support in the instant specification.

(2) Objects of the invention

It is therefore an object of this invention to provide a catalyst which is capable of oxidizing carbon monoxide and hydrocarbons and reducing nitrogen oxides and which exhibits good thermal and chemical stability. It is a further object of this invention to reduce pollution from automotive exhaust gases. It is further an object of this invention to prepare an automobile exhaust catalytic system which is thermally and chemically stable and can be used in either a monolithic form or the more conventional particulate form.

It is a further object of this invention to remove nitrogen oxides from auto exhaust gases without the simultaneous production of ammonia, an undesirable side product. It is a further object of this invention to describe a method of removing nitrogen oxides from auto exhausts when the catalyst, i.e., platinum, is supported on an acid support such as an aluminosilicate.

It is a further object of this invention to describe a system using separate monoliths each of which supports a platinum or palladium catalyst in proper configuration so as to nearly completely remove carbon monoxide and hydrocarbons from auto exhaust. It is a further object of this invention to describe a system wherein palladium is supported on a monolith and platinum is supported on an acidic support (optionally in the form of a monolith) in proper configuration so as to nearly completely remove carbon monoxide, hydrocarbons, and nitrogen oxides from auto exhaust. Other objects will become apparent as the description of this invention proceeds.

BRIEF DESCRIPTION OF THE INVENTION

This invention is a system of removing pollutants from the exhaust fumes produced by internal combustion engines, particularly automobiles. Platinum has been found to be an extremely active catalyst for the oxidation of hydrocarbons but only a moderately active catalyst for carbon monoxide oxidation and generally believed to be a poor catalyst for the removal of nitrogen oxides from automobile exhaust emissions.

Hydrocarbon oxidation catalysts, particularly platinum, are poisoned by the presence of carbon monoxide and is most severely affected with increasing carbon monoxide concentrations. Palladium, on the other hand, has good activity toward carbon monoxide and is a relatively poor hydrocarbon oxidation catalyst. However, if the two catalytic components, i.e., palladium and the hydrocarbon oxidation catalyst, are used in a particular specific configuration in an auto exhaust system, effective removal of both of these pollutants can be accomplished. As reported in said copending application when the exhaust gases are first passed over a palladium catalyst, optionally supported on monolith, and then passed over a hydrocarbon oxidation catalyst, e.g., platinum, optionally supported on a second monolith, there is a significant increase in the overall activity for carbon monoxide and hydrocarbons. By putting hydrocarbon oxidation catalysts and palladium on the same support or a mixture of the two metals on different supports, there is a resulting catalyst with good carbon monoxide activity but poor hydrocarbon activity. If the exhaust gases are initially passed through the hydrocarbon oxidation catalyst and then through the palladium catalyst the platinum is poisoned at low temperatures and thus its effectiveness is decreased. Thus it is essential that a palladium catalyst precede the hydrocarbon oxidation catalyst in the exhaust stream, i.e. that the exhaust gases are exposed to the palladium catalyst prior to exposure to the platinum catalyst so as to prevent poisoning of the platinum. By the use of this system less than 0.15 weight percent of platinum and palladium on suitable supports can be used to provide sufficient activity to meet the 1975 Federal Auto Emissions Standards.

I have found that when platinum is supported on an acidic support, e.g., an aluminosilicate, there is removal of nitrogen oxides. It appears that such a catalyst, platinum on an acidic support, produces very little ammonia as a reaction side product. This production of ammonia has until now been a very serious problem. The use of palladium has led to the production of ammonia because as the exhaust gases are passed over the platinum catalyst carbon monoxide is converted to carbon dioxide and the steam is converted to hydrogen. This hydrogen then reacts with nitrogen oxides to produce ammonia and water. However, by supporting the catalyst on an acidic support the ammonia production is unexpectedly reduced.

Of course, methods of impregnating platinum, palladium, and hydrocarbon oxidation catalysts on supports are well known and depending upon the type of support, monolith or particulate, impregnation can be by spraying, immersing the support in a solution containing the catalyst, or any other convenient means.

I have therefore found a means of removing carbon monoxide, hydrocarbons, and nitrogen oxides from emissions of internal combustion engines, particularly automobile exhaust emissions by the use of platinum, palladium, and hydrocrabon oxidation catalysts supported on independent supports in a specific configuration.

The figure is a schematic drawing of one embodiment of this invention wherein carbon monoxide, hydrocarbons, and nitrogen oxide are substantially removed from the exhaust emissions of an automobile through the system disclosed herein.

DETAILED DESCRIPTION OF THE INVENTION

This invention is a system for removing pollutants from the exhaust gases of land vehicles. It is to be understood that this invention is useful for all land vehicles but for purposes of this specification and claims "automobiles" is used interchangeably with land vehicles.

As stated heretofore, the pollutants with which this disclosure is concerned are carbon monoxide (CO), hydrocarbons (HC), and particularly nitrogen oxides ($NO_x$). It is well known in the art that platinum and palladium are effective catalysts for the removal of carbon monoxide and hydrocarbons from automobile exhaust. However, unless present in large concentrations, i.e., at least 0.30 weight percent, neither is sufficiently active to meet the 1975 Federal Emission Standards. Those standards are as follows: 3.0 g./mile $NO_x$, 0.41 g./mile HC, and 3.4 g./mile CO.

I have found that by supporting platinum on on acidic support nitrogen oxides can be removed from exhaust emissions of internal combustion engines with the production of only a minor, non-harmful, amount of ammonia. By this method, as shown in the figure, the exhaust emissions are first passed over platinum on an acidic support where the nitrogen oxides are reduced to nitrogen and oxygen. This is done as the exhaust emissions leave the engine where the atmosphere is favorable to reducing conditions. The emissions exiting the platinum on the acidic support are then sufficiently free of nitrogen oxides to meet the above-described 1975 Federal Standards. The emissions are then put into an oxidizing atmosphere by introducing air, oxygen, or the like, into the stream and then passing the emissions first through at least one series of palladium and hydrocarbon oxidation catalysts to oxidize the hydrocarbons and carbon monoxide.

The palladium, platinum, and hydrocarbon oxidation catalysts can be supported on any type of structure such as a monolith or the more conventional particulate form. A particularly useful method of preparing a monolithic structure is that disclosed in copending U.S. Ser. No. 82,918, filed Oct. 22, 1970, assigned to same assignee, and incorporated herein by reference. Therein a polyolefin, plasticizer, and filler are admixed, shaped, the plasticizer extracted, the polyolefin burned off, and the alumina sintered. Some of the useful fillers, or support materials include $\alpha$-alumina, mullite, spinel, zircon-mullite, cordierite, spodumene and the like. Of course, monoliths prepared by any process are useful herein. As disclosed in copending U.S. Ser. No. 152,388, filed June 11, 1971, assigned to the same assignee, and incorporated herein by reference, a monolith can preferably be coated with a thin layer of gamma alumina to increase the "activity" of the structure. This gamma alumina can be impregnated with a rare earth oxide(s) as described heretofore, or the entire gamma alumina coated monolithic structure can be sprayed with or immersed in a rare earth solution. As disclosed in said copending application, a preferable method of coating the monolith with gamma alumina is to immerse the entire monolith into a homogeneous slurry prepared by mixing alpha trihydrate (average particle size about 0.2 micron) with a ⅔% solution of carboxymethyl cellulose (CMC) in a weight ratio of 1:2. The slurry also contains sufficient rare earth such that the finally obtained gamma alumina contains about 0.1–10% by weight rare earth metal oxide. The CMC has the effect of quickening the drying steps which are to follow. The monolith is dipped into the slurry, excess slurry is shaken off and the monolith is sprayed with an air hose to remove excess slurry within the monolith. The whole is dried at about 150–200° F. for ½ hour, 1 hour at 300° F., and then at least one hour more to convert the trihydrate to gamma alumina at a temperature of about 1050° F. This procedure provides a monolith containing 10–12% by weight stabilized gamma alumina, said gamma alumina impregnated with 0.1–10% by weight, based on the weight of the alumina, rare earth metal oxide.

Whether the monoliths are made by the above-described process or more conventional processes, or coated or not coated with gamma alumina, they can then be impregnated with platinum, palladium, or hydrocarbon oxidation catalysts by any convenient method. In one convenient method the monolith (acidic) is impregnated with sufficient chloroplatinic acid to deposit about 0.02–0.5 percent by weight platinum within the pores of the monolith, followed by sulfiding, washing, drying, and calcining at 1400° F.

The monolith can be immersed in the impregnating solution, sprayed with the impregnating solution, etc. The impregnation should result in a support containing 0.02–0.5 weight percent platinum. Preferably, the support will be about 0.15% by weight platinum.

The monoliths which are used to remove CO and HC from the emissions are also impregnated with 0.02–0.5 percent by weight (based on the weight of the monolith) of palladium or hydrocarbon oxidation catalyst, e.g. platinum, as the case may be.

Of course, besides a monolith the more conventional particulate support materials can be used. These supports include mullite, spinel, zircon-mullite, $\alpha$-alumina, cordierite, spodumene, and the like. The methods of impregnation may vary, but the percentages of platinum and palladium will remain the same.

It is also possible to use a monolith to support just one catalytic component, i.e., platinum or palladium and the particulate form to support the others, or two of the sections may be monolith, and the other particulate. Any of the possibilities are operable. It is essential that the palladium oxidize the carbon monoxide in the exhaust gases before the exhaust gas stream reaches the hydrocarbon oxidation catalyst.

Some of the acidic supports which are useful herein include in addition to silica alumina gel, the following: $SiO_2 \cdot MgO$, $SiO_2 \cdot ZrO_2$, various ion exchanged zeolites (alkaline earth, rare earths, Type X, Type Y, faujasites, similar A zeolites), mordenite, chabasite, and chlinoptilolite. For a fuller understanding of the acidic support bases operable herein, reference should be made to "Solid Acids and Bases," Kozo Tanabe, Academic Press, N.Y. (1970).

The acidic supported platinum can typically be prepared by gelling aluminum chloride and an orthosilicate in the presence of chloroplatinic acid. Materials such as ammonium fluoride and molecular sieves can be added prior to gelation to increase catalyst activity. This invention is not intended to be limited to any particular method of preparing the platinum (or palladium and hydrocarbon oxidation catalysts). Any method of preparing the catalysts used herein is acceptable.

Typical HC oxidation catalysts which may be used with similar effect in addition to platinum are disclosed in U.S. Pats. Nos. 3,288,558; 3,295,918; 3,304,150; 3,322,491; 3,338,666; 3,346,328; 3,455,843; and 3,470,150. These catalytic compositions include the following catalytic components in percentages by weight of the total catalyst structure:

Catalyst A Catalytic Components: 10% CuO, 4.0% $Cr_2O_3$, 0.02% Pd

Catalyst B Catalytic Components: 8% CuO, 12.0% $MnO_2$, 0.02% Pd

Catalyst C Catalytic Components: 4% CuO, 6% $MnO_2$, 4% $Cr_2O_3$, 0.02% Pd

Also operable are a cobalt oxide catalyst optionally with palladium and optionally containing one or more of the following oxides: nickel, chromium, manganese, and iron.

This invention, then, is that platinum on an acidic support will reduce nitrogen oxides, thereby removing $NO_x$ from the exhaust gases of internal combustion engines. This invention is further that by the use of platinum on an acidic support and palladium and hydrocarbon oxidation catalysts in particular arrangement the exhaust gases of internal combustion engines can be reduced and then oxidized so that the amount of $NO_x$, CO, and HC being produced will meet the 1975 Federal Standards.

When a monolith is used its size is dependent on the need. However, a typical size is 1½" x 4" diameter which it has been found is successful in removing the pollutants described heretofore.

The following examples, while in no way intended to be limiting, will aid in the understanding of this invention.

EXAMPLE 1

A sample of 0.1 weight percent platinum on an aluminosilicate base was prepared by gelling a slightly acidic solution containing 0.17 g. Pt (as $H_2PtCl_6$) 164.3 g. $AlCl_3 \cdot 6H_2O$, 515 ml. $Si(OEt)_4$ and 470 ml. of 50 percent ethanol with 250 g. of propylene oxide. The gel was dried thoroughly at 250° F., mixed with 4% Sterotex and formed into ⅛" pills labeled "Catalyst 1." After being calcined for 3 hours at 1000° F., the pills were placed in a micro-reactor and contacted with a synthetic exhaust stream comprising by weight the following: 0.5% $O_2$, 1000 p.p.m. $NO_x$, 125 p.p.m. hexane (HC), 1% CO, 10% $CO_2$, 10% $H_2O$ and the balance being nitrogen.

With the micro-reactor held at 850° F. Catalyst 1 showed a conversion of $NO_x$ to nitrogen of greater than 90%. Further analysis showed the production of about 60 p.p.m. $NH_3$ (only about 7% of the total $NO_x$ conversion).

EXAMPLE 2

250 g. of alumina pills (W. R. Grace & Co.) were impregnated with chloroplatinic acid to produce a 0.1 weight percent Pt on alumina and labeled "Catalyst 2." This catalyst was then exposed to the synthetic exhaust stream as in Example 1. 300 p.p.m. $NH_3$ (30% of the total $NO_x$ conversion) were produced.

EXAMPLES 3-7

Example 1 was repeated except that the silica-alumina was replaced with the following acidic supports with similar results:

Example 3: $SiO_2 \cdot ZrO_2$;
Example 4: Mordenite;
Example 5: Chabasite;
Example 6: Clinoptilolite; and
Example 7: Type Y Zeolite It is to be understood that for purposes of the specification and claims reference to parts should be interpreted as being parts by weight. It is further to be understood that "support" refers to monoliths, coated monoliths, and particulate forms.

This invention is therefore a composition of matter useful as internal combustion engine exhaust catalyst which comprises 0.02-0.5 part platinum and 99.98-99.5 parts acidic support.

This invention is further a method for reducing nitrogen oxides in exhaust gases of internal combustion engines which comprises passing said exhaust gases through a bed of a platinum catalyst, said platinum catalyst comprising 0.02-0.5 part platinum and 99.98-99.5 parts acidic support.

This invention is also a method of removing pollutants from exhaust gases of internal combustion engines which comprises the following sequential steps:

(a) Passing said exhaust gases through a first catalyst bed comprising platinum on an acidic support;

(b) Adding an oxidizing atmosphere to said exhaust gases after said exhaust gases have been passed through said first catalyst bed;

(c) Passing said exhaust gases through a second catalyst bed comprising 0.02-0.5 part palladium and 99.98-99.5 parts support material;

(d) Passing said exhaust gases through a third catalyst bed comprising a hydrocarbon oxidation catalyst supported on a catalyst bed.

(e) Passing said exhaust gases to the atmosphere.

This invention is also an apparatus for removing pollutants from exhaust gases of internal combustion engines comprising:

(a) A means to direct said exhaust gases to a first catalyst bed;

(b) A first catalyst bed comprising 0.02-0.5 part platinum and 99.98-99.5 parts acidic catalyst support;

(c) A second catalyst bed comprising 0.02-0.5 part palladium and 99.98-99.5 parts catalyst support;

(d) A first connecting means for passing said exhaust gases from said first catalyst bed to said second catalyst bed;

(e) A means for introducing an oxidizing atmosphere, typically air, into said exhaust gases after said exhaust gases have exited said first catalyst bed;

(f) A third catalyst bed comprising 0.02-0.5 part hydrocarbon oxidation catalyst and 99.98-99.5 parts catalyst support;

(g) A second connecting means for passing said exhaust gases from said second catalyst bed to said third catalyst bed; and (h) Means for passing said exhaust gases from said third catalyst bed to the atmosphere.

The means for directing the exhaust gases to the first catalyst bed may be any type of conduit capable of transporting the gases to the first bed. The means for connecting the catalyst beds is also a simple conduit. The means for introducing the oxidizing atmosphere to the exhaust gases may be any type of injector means such as a nozzle and pump.

What is claimed is:

1. A method of removing pollutants from exhaust gases of internal combustion engines which comprises the following sequential steps:
   (a) passing said exhaust gases through a first catalyst bed comprising platinum on an acidic support,
   (b) adding an oxidizing atmosphere to said exhaust gases after said exhaust gases have been passed through said first catalyst bed,
   (c) passing said exhaust gases through a second catalyst bed comprising 0.02-0.5 part palladium and 99.98-99.5 parts support material,
   (d) passing said exhaust gases through a third catalyst bed containing a hydrocarbon oxidation catalyst comprising oxides of copper, chromium, manganese, and palladium supported on a catalyst bed,
   (e) passing said exhaust gases to the atmosphere.

2. A method of removing pollutants from exhaust gases of internal combustion engines which comprises the following sequential steps:
   (a) passing said exhaust gases through a first catalyst bed comprising platinum on an acidic support,
   (b) adding an oxidizing atmosphere to said exhaust gases after said exhaust gases have been passed through said first catalyst bed,
   (c) passing said exhaust gases through a second catalyst bed comprising 0.02-0.5 part palladium and 99.98-99.5 parts support material,
   (d) passing said exhaust gases through a third catalyst bed containing a hydrocarbon oxidation catalyst comprising the oxides of cobalt, copper, chromium and palladium supported on a catalyst bed,
   (e) passing said exhaust gases to the atmosphere.

3. A method of removing pollutants from exhaust gases of internal combustion engines which comprises the following sequential steps:
   (a) passing said exhaust gases through a first catalyst bed comprising platinum on an acidic support,
   (b) adding an oxidizing atmosphere to said exhaust gases after said exhaust gases have been passed through said first catalyst bed,
   (c) passing said exhaust gases through a second catalyst bed comprising 0.02-0.5 part palladium and 99.98-99.5 parts support material,
   (d) passing said exhaust gases through a third catalyst bed containing a hydrocarbon oxidation catalyst comprising copper and chromium oxides and palladium supported on a catalyst bed,
   (e) passing said exhaust gases to the atmosphere.

4. A method of removing pollutants from exhaust gases on internal combustion engines which comprises the following sequential steps:
   (a) passing said exhaust gases through a first catalyst bed comprising platinum on an acidic support,
   (b) adding an oxidizing atmosphere to said exhaust gases after said exhaust gases have been passed through said first catalyst bed,
   (c) passing said exhaust gases through a second catalyst bed comprising 0.02-0.5 part palladium and 99.98-99.5 parts support material,
   (d) passing said exhaust gases through a third catalyst bed containing a hydrocarbon oxidation catalyst comprising cobalt and nickel oxides and palladium supported on a catalyst bed, (e) passing said exhaust gases to the atmosphere.

References Cited

UNITED STATES PATENTS

| | | | |
|---|---|---|---|
| 2,664,340 | 12/1953 | Houdry | 23—2 E |
| 3,109,715 | 11/1963 | Johnson et al. | 23—2 E |
| 3,316,057 | 4/1967 | Howk et al. | 23—2 E |
| 3,476,508 | 11/1969 | Kearby et al. | 23—2 E |
| 3,565,830 | 2/1971 | Keith et al. | 23—2 E |

FOREIGN PATENTS

| | | |
|---|---|---|
| 971,994 | 10/1964 | Great Britain. |
| 972,683 | 10/1964 | Great Britain. |

GEORGE O. PETERS, Primary Examiner

U.S. Cl. X.R.

60—301; 423—213